(12) United States Patent
Isogawa et al.

(10) Patent No.: US 6,358,105 B1
(45) Date of Patent: Mar. 19, 2002

(54) COWLING ARRANGEMENT FOR OUTBOARD MOTOR

(75) Inventors: Atsushi Isogawa; Hitoshi Ishida, both of Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/299,537

(22) Filed: Apr. 26, 1999

(30) Foreign Application Priority Data

Apr. 24, 1998 (JP) ............................................. 10-114430

(51) Int. Cl.⁷ ............................................... B63H 20/32
(52) U.S. Cl. ........................................................ 440/77
(58) Field of Search ............................ 440/76–78, 900, 440/88; 123/195 P, 195 C

(56) References Cited

U.S. PATENT DOCUMENTS

| 4,126,115 A | | 11/1978 | List et al. |
| 4,522,602 A | | 6/1985 | Okazaki |
| 4,533,331 A | | 8/1985 | Bland |
| 4,721,485 A | | 1/1988 | Suzuki |
| 4,734,070 A | * | 3/1988 | Mondek ....................... 440/88 |
| 4,878,467 A | | 11/1989 | Schmidt |
| 4,952,180 A | | 8/1990 | Watanabe et al. |
| 4,960,081 A | | 10/1990 | Atsuumi |
| 4,967,704 A | | 11/1990 | Imaeda |
| 4,978,321 A | | 12/1990 | Ferguson |
| 5,049,100 A | | 9/1991 | Yamamoto et al. |
| 5,328,395 A | | 7/1994 | Oishi |
| 5,340,343 A | | 8/1994 | Kawamukai et al. |
| 5,445,547 A | | 8/1995 | Furukawa |
| 5,488,939 A | | 2/1996 | Nakai et al. |
| 5,489,227 A | | 2/1996 | Ishida et al. |
| 5,503,577 A | * | 4/1996 | Ming et al. .................... 440/76 |
| 5,713,772 A | * | 2/1998 | Takahashi et al. ............ 440/78 |
| 5,873,755 A | | 2/1999 | Takahashi et al. |
| 5,899,778 A | | 5/1999 | Hiraoka et al. |

FOREIGN PATENT DOCUMENTS

| JP | 59-100093 | 6/1984 |
| JP | 2-212295 | 8/1990 |
| JP | 4-166496 | 6/1992 |
| JP | 6-16187 | 1/1994 |

* cited by examiner

Primary Examiner—Ed Swinehart
(74) Attorney, Agent, or Firm—Knobbe, Martens, Olson & Bear, LLP

(57) ABSTRACT

An improved cowling arrangement for an outboard motor powered by an internal combustion engine. The improved arrangement includes a flywheel cover and cowling that incorporate upwardly and downwardly extending ribs which are positioned along an air path between the air vent of the outboard motor and the throttle body of the motor. These ribs act as labyrinth-type seals which prevent water entering the air vent from contacting the throttle body. Also disclosed is an improved cowling arrangement that prevents water pooled on the flywheel cover from draining onto the throttle body when the motor is tilted, such as when the watercraft banks into a turn.

44 Claims, 9 Drawing Sheets

COWLING ARRANGEMENT FOR OUTBOARD MOTOR

RELATED APPLICATIONS

This application is based on and claims priority to Japanese Patent Application No. 10-114430, which was filed on Apr. 24, 1998.

BACKGROUND OF THE INVENTION

1. Field of the Invention

The present invention generally relates to an outboard motor for use with a watercraft. More specifically, the present invention relates to a cowling for an outboard motor powered by an internal combustion engine.

2. Description of Related Art

Outboard motors are often powered by internal combustion engines. The engine is typically positioned within an enclosed cowling. The engine is generally vertically arranged, so that a crankshaft thereof may extend downwardly in driving relation with a water propulsion device of the motor, such as a propeller. In order to balance the motor and because of space considerations, the engine is arranged with a crankcase of the engine facing in the direction of a watercraft to which the motor is mounted (i.e., positioned on a front side of the engine), and with the cylinder head positioned on an end of the engine facing away from the watercraft (i.e., positioned on a rear side of the engine).

Air must be supplied to the engine through the cowling for combustion. Conventionally, the cowling is divided into an engine compartment and an air guide chamber, with an air vent in the cowling communicating with the air guide chamber. Outside air is supplied to the engine through the air vent and air guide chamber. In order to prevent the direct entry of water through the air vent into the intake system, the air vent is positioned away from the intake system, typically in the end of the engine facing away from the watercraft.

In order to adjust the amount of air that flows into the engine, the engine typically includes a throttle device. However, when water splashes into the air vent, it can flow through the air guide chamber and deposit on the throttle body, often resulting in malfunctioning of and/or damage to the throttle device. In addition, during watercraft turns, any water that pools on the flywheel cover can often drain onto the throttle body.

SUMMARY OF THE INVENTION

A need therefore exists for a cowling arrangement of an outboard motor which permits the engine to draw sufficient quantities of fresh air, but which prevents the impingement of water on the throttle body desired.

In accordance with the present invention, there is provided a cowling arrangement for an outboard motor powered by an internal combustion engine. The motor is preferably of the type in which the engine is positioned within an engine compartment defined by the cowling. The engine has a top end and a bottom end and a generally vertically oriented crankshaft extending in driving relationship with a water propulsion device of the motor. The cowling arrangement allows large quantities of fresh air for engine combustion while significantly reducing the amount of water which contacts the throttle body.

In a preferred embodiment, the cowling includes a flywheel cover which substantially covers the upper surface of the flywheel and engine. A rib is formed in a portion of the flywheel cover near the throttle body. This rib extends upwards and prevents water splashing into the engine compartment from splashing on the throttle body. Moreover, this rib redirects air passing over the flywheel cover near the throttle body, acting as a labyrinth, which tends to remove water suspended in the air which passes over the throttle body. In addition, a downwardly extending rib extending from the cowling towards the flywheel cover further prevents splashing of water and further redirects the air flowing towards the throttle body.

If desired, a gutter can be formed in the flywheel cover. The gutter provides a channel for draining water off the flywheel cover, thereby preventing pooled water from draining on the throttle body during watercraft turns. In addition, where air guide chamber is narrow, such as where there is little separation between the flywheel cover and the cowling, the addition of a gutter to the flywheel cover can significantly increase the effective height of the rib, thereby permitting more water to be removed from the air before it passes over the throttle body.

In another preferred embodiment, the rib extending downward from the cowling is formed in a continuous L-shape, which further reduces the possibility that splashing water will contact the throttle body, and reduces the chance that water condensing on the dividing wall section of the cowling will subsequently travel over and drip onto the throttle body.

Another aspect of the present invention involves an outboard motor for operating in a body of water. The motor comprises a cowling having an air intake. An internal combustion engine is positioned within the cowling and includes a generally vertically oriented crankshaft. A flywheel is attached to an upper end of the crankshaft, and at least one throttle device is positioned on a side of the engine to adjust an air volume supplied to the engine. A flywheel cover extends above at least a portion of the flywheel and is positioned between an upper end of the engine and a portion of the cowling. The flywheel cover includes at least one upwardly extending rib that is positioned between the air intake and the throttle device so as to direct water, which enters the cowling through the air intake, away from the throttle device.

Further aspects, features, and advantages of the present invention will become apparent from the detailed description of the preferred embodiments which follow.

BRIEF DESCRIPTION OF THE DRAWINGS

The above-mentioned and other features of the invention will now be described with reference to the drawings of preferred embodiments of the present watercraft. The illustrated embodiments of the watercraft are intended to illustrate, but not to limit the invention. The drawings contain the following figures.

DETAILED DESCRIPTION OF PREFERRED EMBODIMENTS OF THE INVENTION

Figure 1:
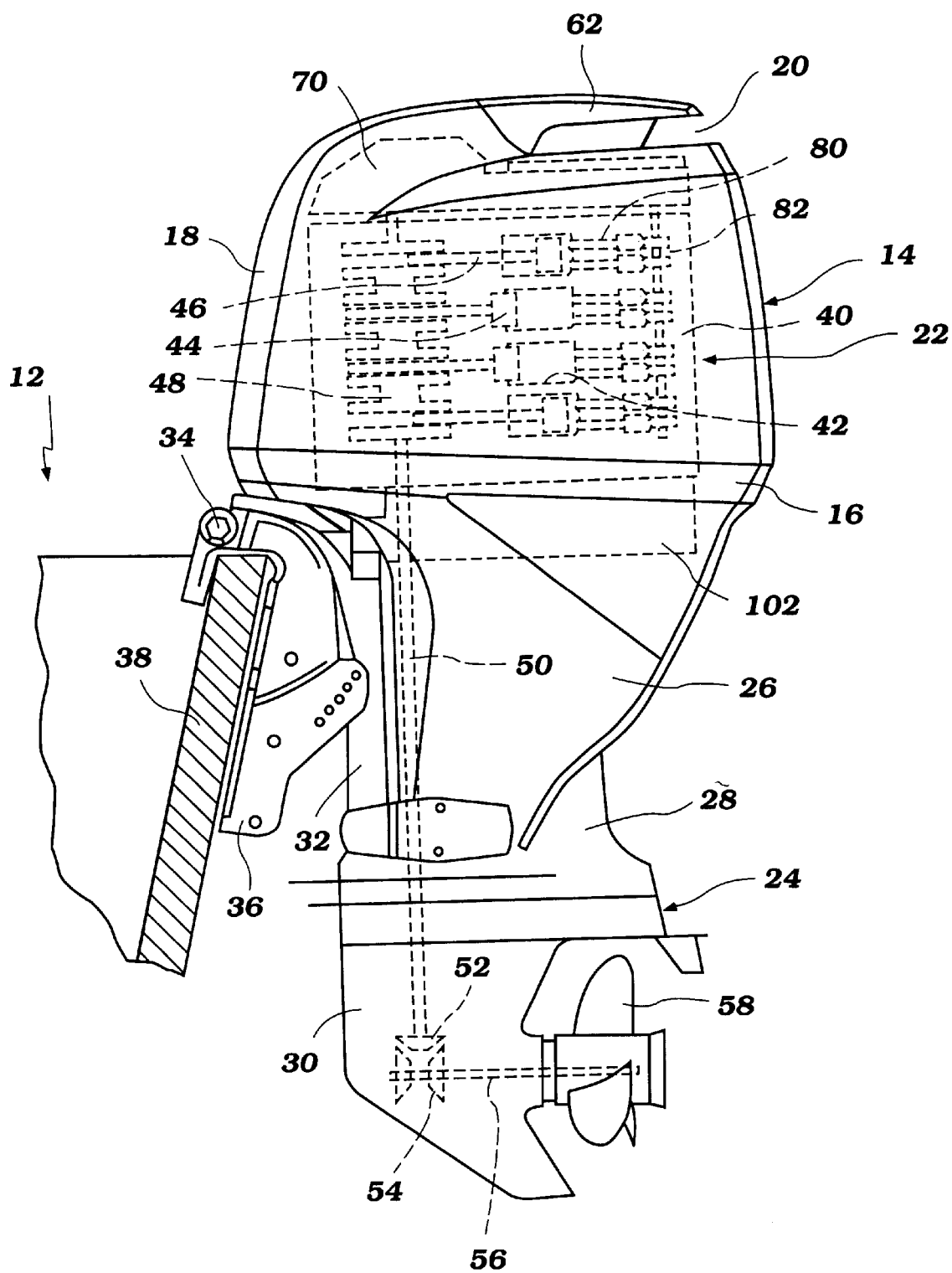
FIG. 1 is a side elevational view of an outboard motor with a cowling arrangement constructed in accordance with a preferred embodiment of the present invention, with various internal components of the motor illustrated in phantom.
Figure 2:
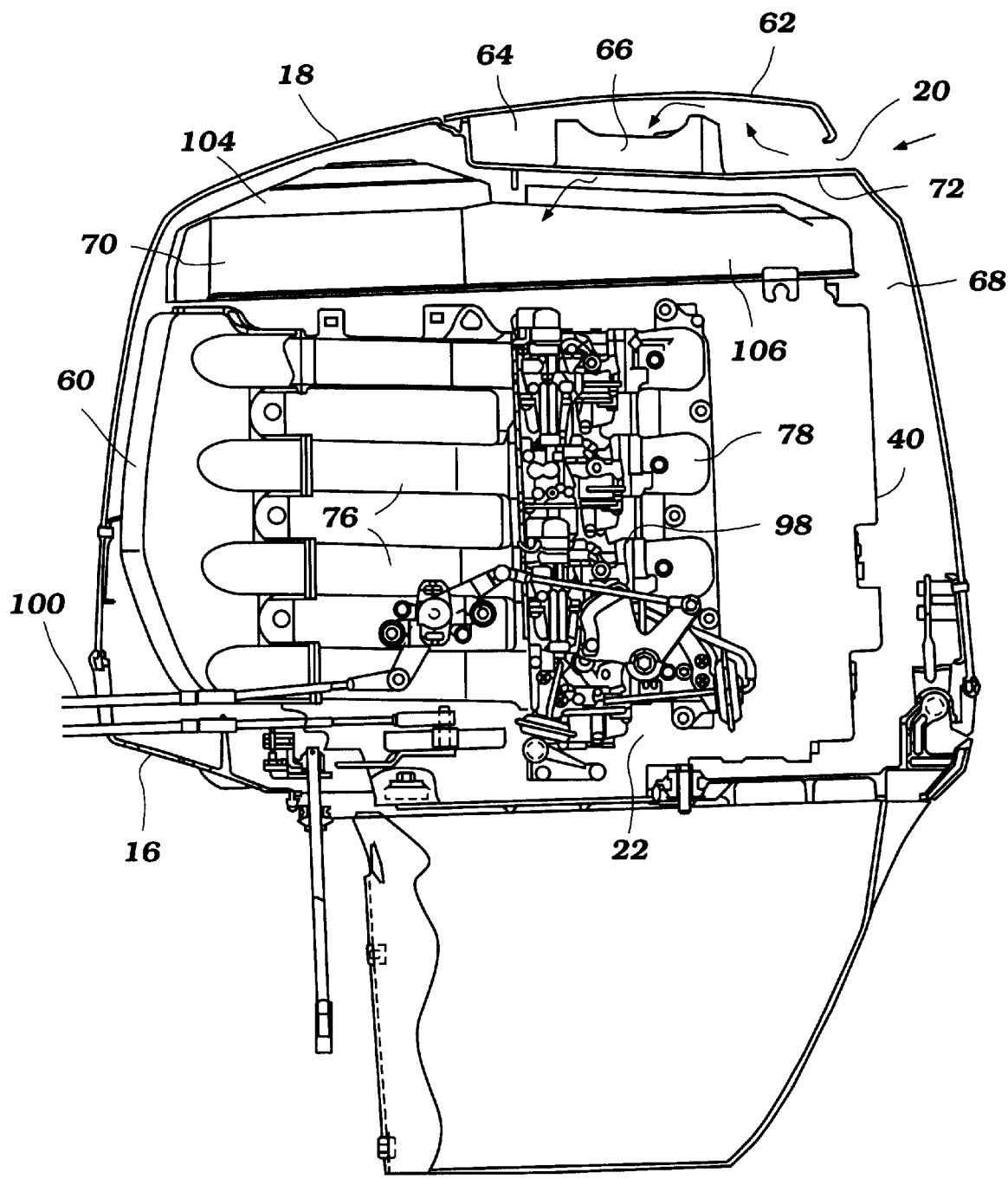
FIG. 2 is an enlarged partial sectional side view of the outboard motor of FIG. 1.

With reference to FIG. 1, the outboard motor 10 is utilized to power a watercraft 12. The outboard motor 10 has a power head area 14 comprised of a lower tray portion 16 and a main cowling portion 18. An air inlet or vent 20 is provided in the main cowling portion 18 for providing air to an engine 22 therein, as described in more detail below. The motor 10 includes a lower unit 24 extending downwardly therefrom, with an apron 26 providing a transition between the powerhead 14 and the lower unit 24. The lower unit 24 comprises an upper or "drive shaft housing" section 28 and a lower section 30.

A steering shaft (not shown) is affixed to the lower section 30 of the lower unit 24 by means of a bracket (not shown). The steering shaft is supported for steering movement about a vertically extending axis within a swivel bracket 32. The swivel bracket 32 is connected by means of a pivot pin 34 to a clamping bracket 36 which is attached to the transom 38 of the watercraft 12. The pivot pin 34 permits the outboard motor 10 to be trimmed and tilted up about the horizontally disposed axis formed by the pivot pin 34.

The power head 14 of the outboard motor 10 includes the engine 22 which is positioned within the cowling portion 18. The engine 22 is preferably of the in-line, four-cylinder, four-cycle variety, and thus includes an engine case 40 having a cylinder bank including four variable-volume chambers or cylinders 42. Within the cylinders are disposed reciprocating pistons 44, which are connected to the crankshaft 48 through connecting rods 46. The connecting rods 46 convert the lateral motion of the pistons to the rotary motion of the crankshaft in a well known manner. The engine 22 is preferably oriented within the cowling 18 such that the crankshaft 48 is positioned on the side of the engine 22 towards the watercraft 12, with the crankshaft 48 of the motor 10 rotating about a vertically extending axis. A flywheel 110 is secured to the upper end of the crankshaft 48.

A drive shaft 50 is connected to the crankshaft 48. The drive shaft extends downward into the lower unit 24 and drives a bevel gear 52 and a conventional forward-neutral-reverse transmission 54. The transmission 54 drives a propeller shaft 56 which is journalled within the lower section 30 of the lower unit 24 in a known manner. A propeller hub 58 is coupled to the propeller shaft 56 for providing a propulsive force to the watercraft 12 in a manner well known in the art.

An air intake system provides air to each combustion chamber. Described here is the "engine" portion of the intake system including a silencer 60 and air delivery system. The portion of the air intake system which delivers air into the engine compartment 68 is described in more detail below.

Air in the engine compartment 68 enters the silencer 60 through a suction port 74. The silencer 60 is preferably positioned on the side of the engine 22 facing the watercraft 12. Air is routed from the silencer 60 by intake pipes 76 to passages extending through an intake manifold 78. Each passage in the manifold 78 leads to a corresponding cylinder 42 of the engine 22.

Air is supplied to each of the cylinders 42 through an intake valve 80. As illustrated, each of the intake valves 80 are preferably actuated by an intake camshaft 82. This camshaft 82 is mounted for rotation with respect to the engine 22 and connected thereto by brackets (not shown). The camshaft 82 is typically enclosed by a camshaft cover (not shown) which is connected to the engine 22.

An exhaust system is provided for routing the products of combustion within the cylinders 42 to a point external to the engine 22. In particular, each of the cylinders 42 incorporates an exhaust valve 84 which controls the flow of exhaust gases from the cylinder 42. Like the intake valves 80, the exhaust valves 84 are preferably all actuated by an exhaust camshaft 86. The exhaust camshaft 86 is journalled for rotation with respect to the engine 22, and connected thereto with at least one bracket (not shown) and enclosed by a camshaft cover. Typically, the exhaust gases are routed through exhaust passages (not shown), and through an exhaust guide 102, positioned at the bottom of the engine 22. The exhaust guide 102 typically has a passage (not shown) extending therethrough which is in communication with the exhaust passages from the cylinder 42. An exhaust pipe (not shown) is connected to the bottom side of the exhaust guide 102, and typically terminates within a chamber formed within a muffler (not shown). An exhaust gas outlet (not shown) is typically provided in the lower unit 24 of the outboard motor 10, and exhaust gas is normally routed to a point external to the motor 10, normally through a passage extending through the propeller hub 58. Because the construction and operation of the exhaust system is well known in the art, and its construction per se forms no part of the present invention, further explanation is not deemed necessary.

Figure 3:
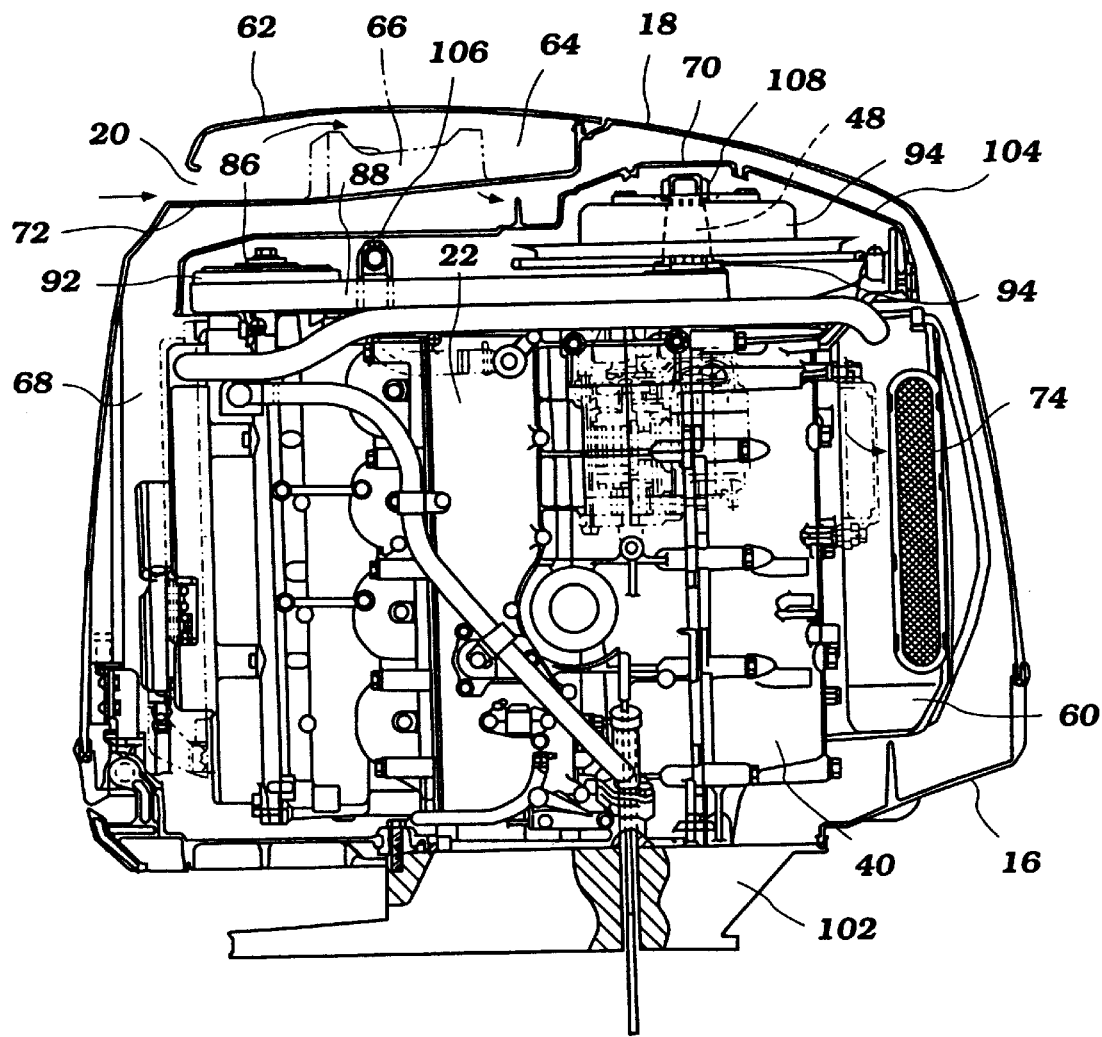
FIG. 3 is an enlarged partial sectional side view of the outboard motor of FIG. 1, as view from a side of the motor opposite of that shown in FIG. 2.
Figure 7:
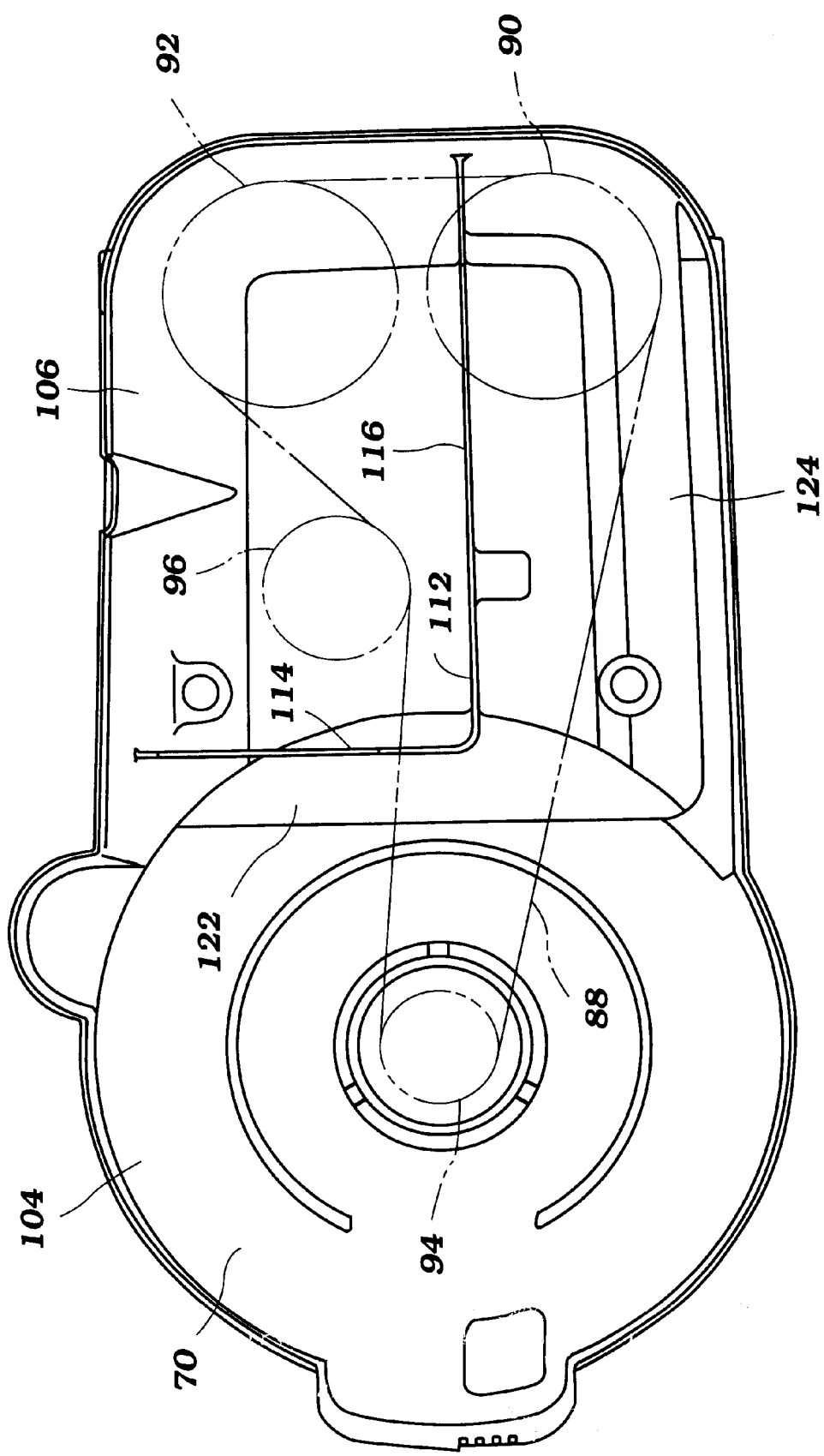
FIG. 7 is a top plan view of the flywheel cover of FIG. 5, with various components of the motor illustrated in phantom.

As can be best seen in FIGS. 3 and 7, a crankshaft pulley 94 is secured to the upper end of the crankshaft 48 by a nut 108 or other securing means well known in the art. Similarly, the intake camshaft 82 is coupled to an intake pulley 90 and the exhaust camshaft 86 is coupled to an exhaust pulley 92. The crankshaft pulley 94, intake pulley 90 and exhaust pulley 92 are linked by a timing belt 88, with the crankshaft pulley 94 driving the intake and exhaust pulleys 90, 92. One or more tensioners 96 may be provided for maintaining the belt 88 in a taut condition.

A fuel delivery system is provided for delivering fuel to each cylinder 42 for combustion therein. The fuel delivery system includes a remote fuel tank (not shown) and a number of fuel pumps (not shown) for pumping fuel from the tank and delivering it to each cylinder 42. As known to this skilled in the art, the fuel may be delivered into the incoming air stream, such as with a carburetor or fuel injector, or directly injected into the combustion chamber with a fuel injector.

A throttle device 98 is provided for controlling the flow of air into each cylinder 42. Preferably, the throttle device 98 comprises a moveable valve positioned within a flow passage through a body of the throttle device. The body is positioned between adjoining sections of the corresponding intake pipe 76. The throttle device 98 is preferably controlled through a throttle adjustment mechanism 100 in the form of a cable extending from a control area of the watercraft 12, whereby the operator of the watercraft may control the throttle remotely therefrom. The throttle devices can be operated by a throttle linkage, which the cable actuates, or by electronic means as known in the art (e.g., fly-by-wire technology).

A suitable ignition system is provided for igniting an air and fuel mixture within each cylinder 42. Such systems are well known to those skilled in the art. The ignition system portion of the invention herein, such is not described in detail.

The engine includes a lubricating system for providing lubricant to various portions of the engine. The lubricating system is not described in detail here, and may be of a variety of types found suitable to those skilled in the art. Generally, the lubricating system comprises an oil reservoir (not shown) positioned below the engine 22. The reservoir is in communication with an oil pump (not shown), preferably positioned on the end of the crankshaft 48 at the bottom of the engine 22. The oil pump pumps lubricant from the reservoir through oil passages (not shown) throughout the engine 22. The pumped oil drains from the engine 22 back to the reservoir for recirculation by the pump.

In accordance with the present invention, the outboard motor 10 incorporates an improved flywheel cover 70 and cowling 18 which allow the free flow of air into the engine compartment 68 for cooling and combustion, yet limit the amount of water that impinges upon the throttle device 98 and associated actuation mechanism (e.g., throttle linkage). The flywheel cover 70 is secured over and substantially covers the entire top surface of the engine 22. The flywheel cover 70 comprises a forward end 104 and a rearward end 106, with the forward end 104 fitting substantially over the flywheel 110, the upper end of the crankshaft 48 and the forward half of the engine case 40. Similarly, the rearward end 106 of the flywheel cover 70 fits substantially over the intake and exhaust pulleys 90, 92 and the rearward half of the engine case 40.

Figure 4:
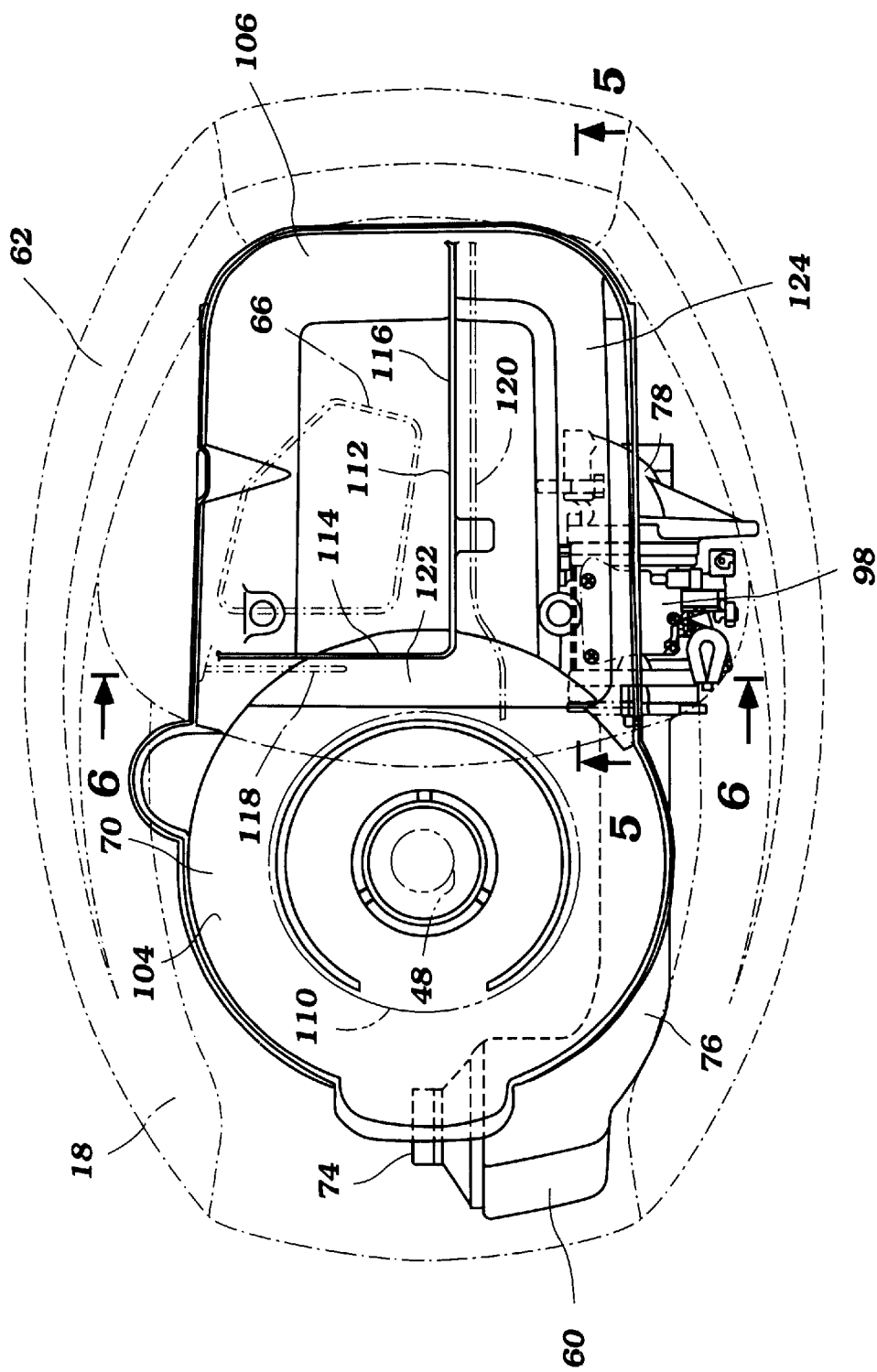
FIG. 4 is a sectional top plan view of the outboard motor of FIG. 1, with various components of the motor illustrated in phantom.
Figure 5:
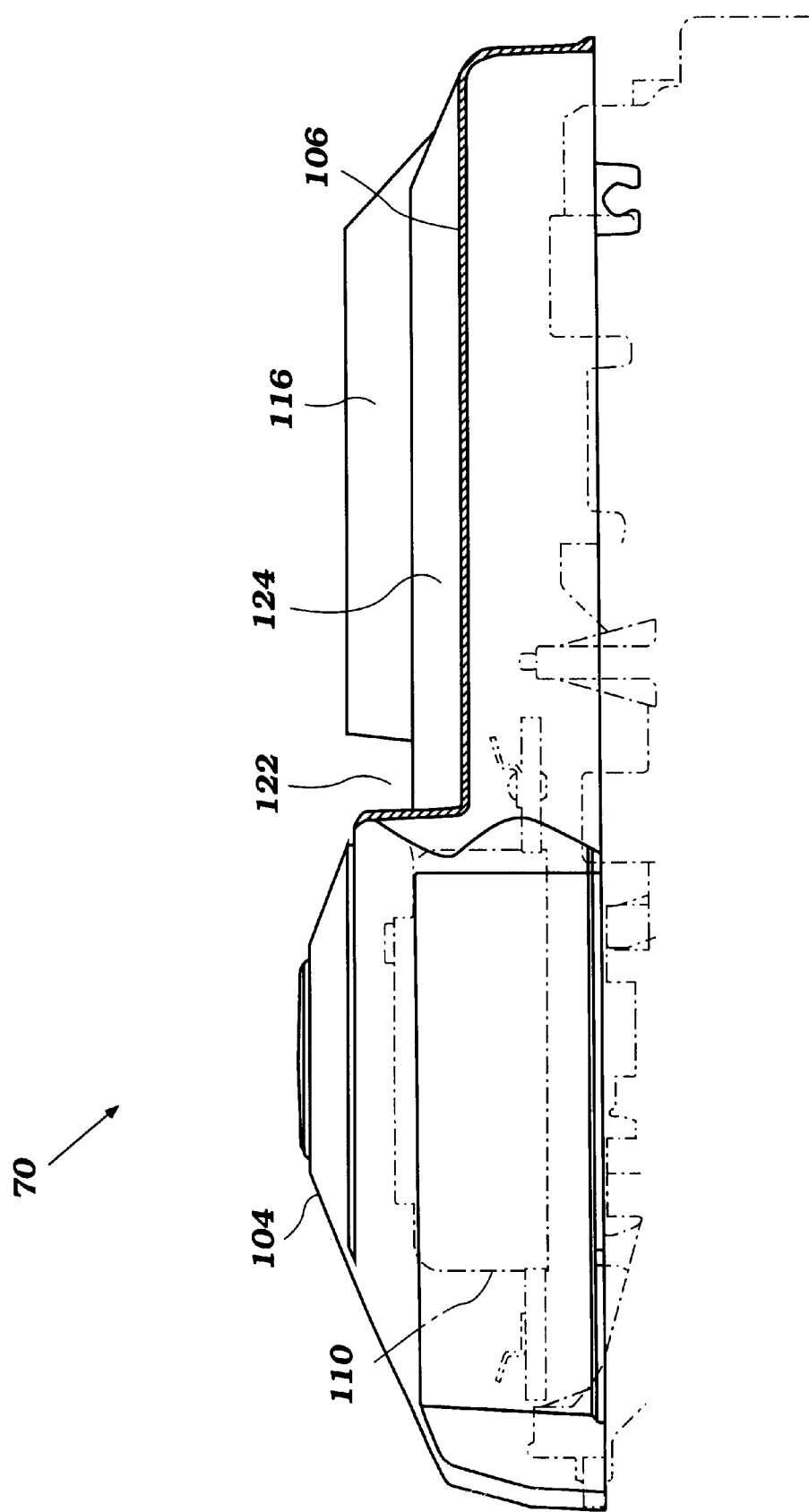
FIG. 5 is a partial cross-sectional side view of the outboard motor of FIG. 4, taken along line 5—5, depicting the flywheel cover, with various components of the motor illustrated in phantom.

As can be best seen from FIGS. 4 and 5, the forward end 104 of the flywheel cover 70 is formed is an inverted bowl-type shape. In contrast, the rearward end 106 of the flywheel cover 70 is essentially a flat planar surface covering the rearward portion of the engine case 40.

In the embodiment disclosed in FIGS. 4 and 5, an upwardly extending ridge 112 is formed in the upper surface of the rearward end 106 of the flywheel cover 70. The ridge comprises a front rib 114 and a side rib 116, with the front rib 114 desirably located forward of the hollow air duct 66. Similarly, the side rib 116 is desirably located between the hollow air duct 66 and the side of the flywheel cover 70 nearest the throttle device 98. In the disclosed embodiment, the front and side ribs 114, 116 are connected to each other.

On the underside of the dividing wall section 72 of the cowling 18 is formed a downwardly extending forward rib 118 and a downwardly extending lateral rib 120 (that extends in a side-to-side direction). The forward rib 118 is located forward of the front rib 114, and the lateral rib 120 is located between the side rib 116 and the side of the flywheel cover 70 nearest the throttle device 98.

As noted previously, water which works its way into the engine compartment 68 through the hollow air duct 66 usually impinges upon the flywheel cover 70, and will subsequently spray into the engine compartment 68 and/or pool on the flywheel cover 70, eventually draining over the engine 22 when the outboard motor leans in a turn. The ridge 112 extending upwards from the flywheel cover 70, however, acts as a barrier to this water, inhibiting water from splashing towards the throttle device 98 and redirecting water towards the opposite side and the rear of the engine 22. In addition, the downwardly extending forward and lateral ribs 118, 120, in concert with the front and side ribs 114, 116 of the flywheel cover 70, redirect the air travelling towards the throttle devices 98, and act as labyrinth (i.e., they form a torturous path) to remove water from the air entering the engine compartment. In this way, the amount of water that impinges directly on the throttle devices 98 is reduced and/or eliminated, but the flow of air into the engine compartment 68 is not substantially impeded.

Figure 6:
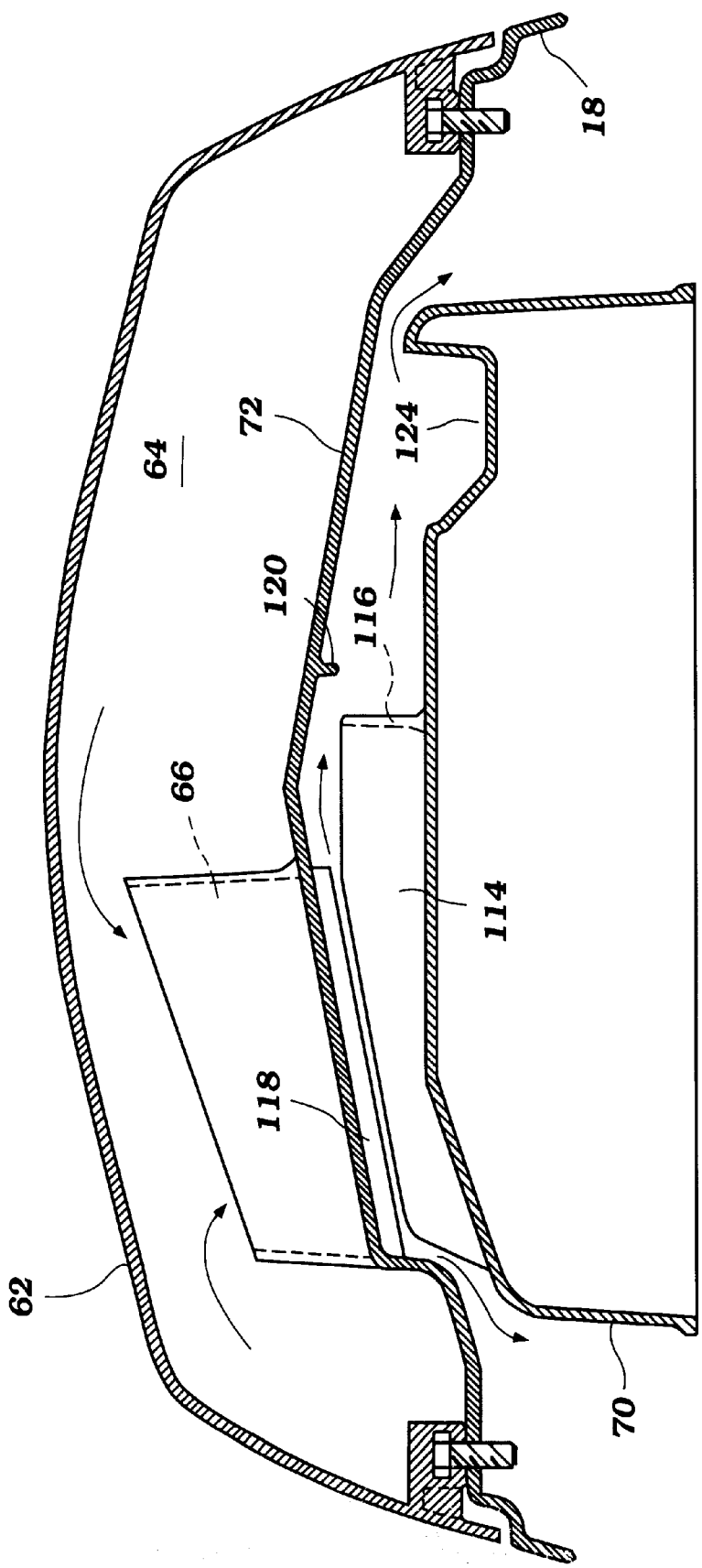
FIG. 6 is a partial cross-sectional front view of the outboard motor of FIG. 4, taken along line 6—6, depicting the cowling and flywheel cover.
Figure 9:
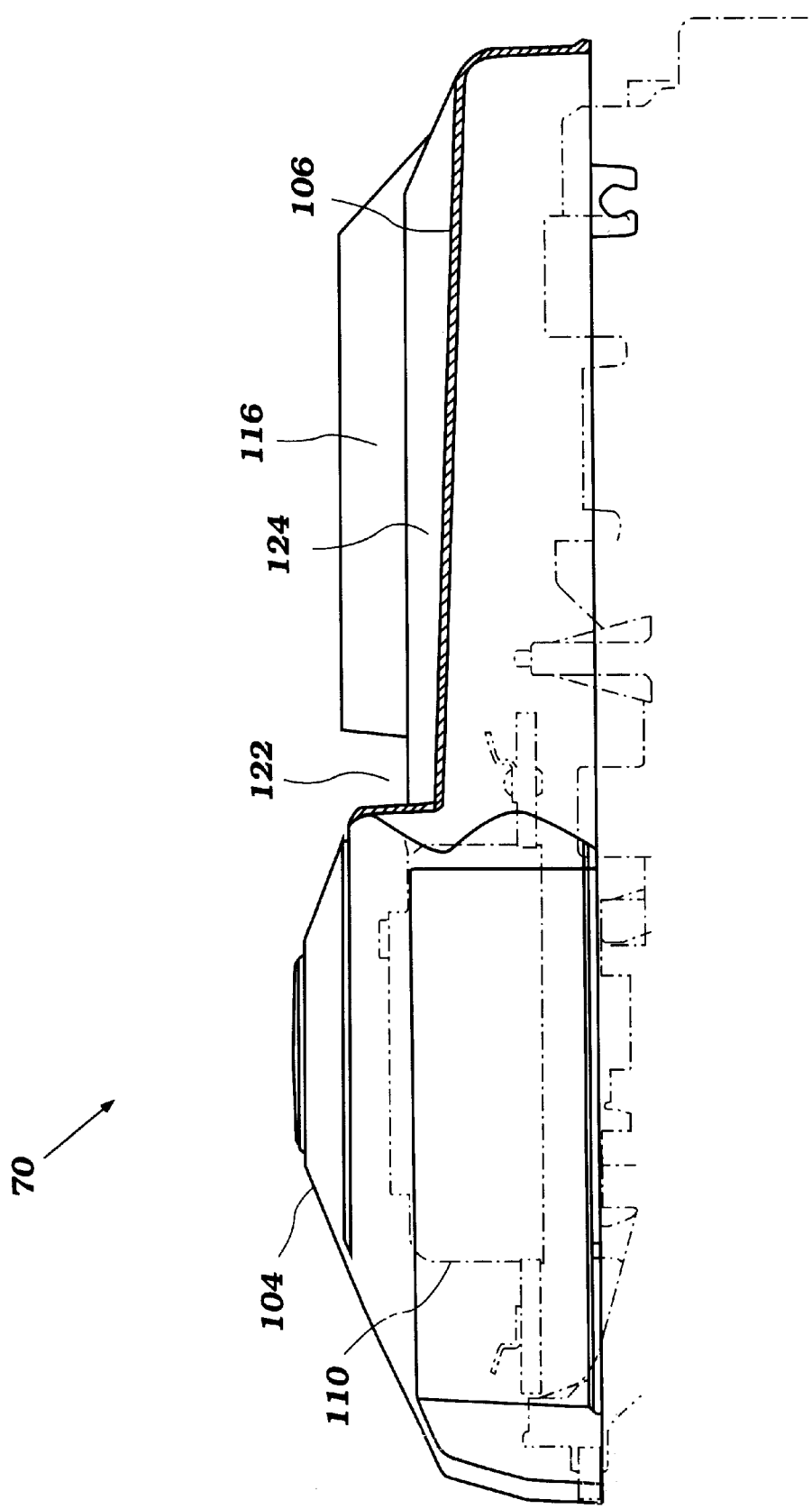
FIG. 9 shows a flywheel cover having features in accordance with the present cowling arrangement, shown in a view similar to the view in FIG. 5.

In order to further minimize the amount of water impinging upon the throttle devices 98, a front gutter 122 and a side gutter 124 are formed in the flywheel cover 70. As best seen in FIGS. 5 and 6, the front gutter 122 is desirably located between the ridge 112 and the forward end 104 of the flywheel cover 70, and this gutter 122 extends laterally across the flywheel cover 70. The side gutter 124 is desirably located between the side rib 116 and the edge of the flywheel cover 70 nearest the throttle body 98, and this gutter 124 extends longitudinally (i.e., in a fore-to-aft direction) towards the rear of the flywheel cover 70. Desirably, the side gutter 124 is positioned lower than the front gutter 124, and the side gutter 124 is open at the rear of the flywheel cover 70—i.e. the rear of the gutter is open to allow water collecting in the side gutter 124 to drain out the rear of the gutter. As shown in FIG. 9, the side gutter 124 slopes downward toward the rear to promote water drainage from atop the flywheel cover 70.

During operation of the outboard motor, water will often enter the air vent 20 and eventually pass into the engine compartment 68. As previously noted, much of this water will be directed away from the throttle devices by the ribs 114, 116, 118, 120. However, some water is likely to work past the ribs, especially where there is little clearance between the flywheel cover 70 and the cowling 18, and the ribs are consequently short. In addition, water may condense on the surfaces of the flywheel cover 70. In such a case, a large amount of water can pool on the flat surfaces of the flywheel cover 70, and can eventually drain onto the throttle devices 98 when the watercraft 12 tilts, as when the watercraft 12 is banking into a turn. By incorporating front and side gutters 122, 124 into the flywheel cover 70, however, the gutters 122, 124 collect and drain this water away from the throttle body 98, thereby reducing the opportunity for water to drain onto the throttle body 98.

Figure 8:
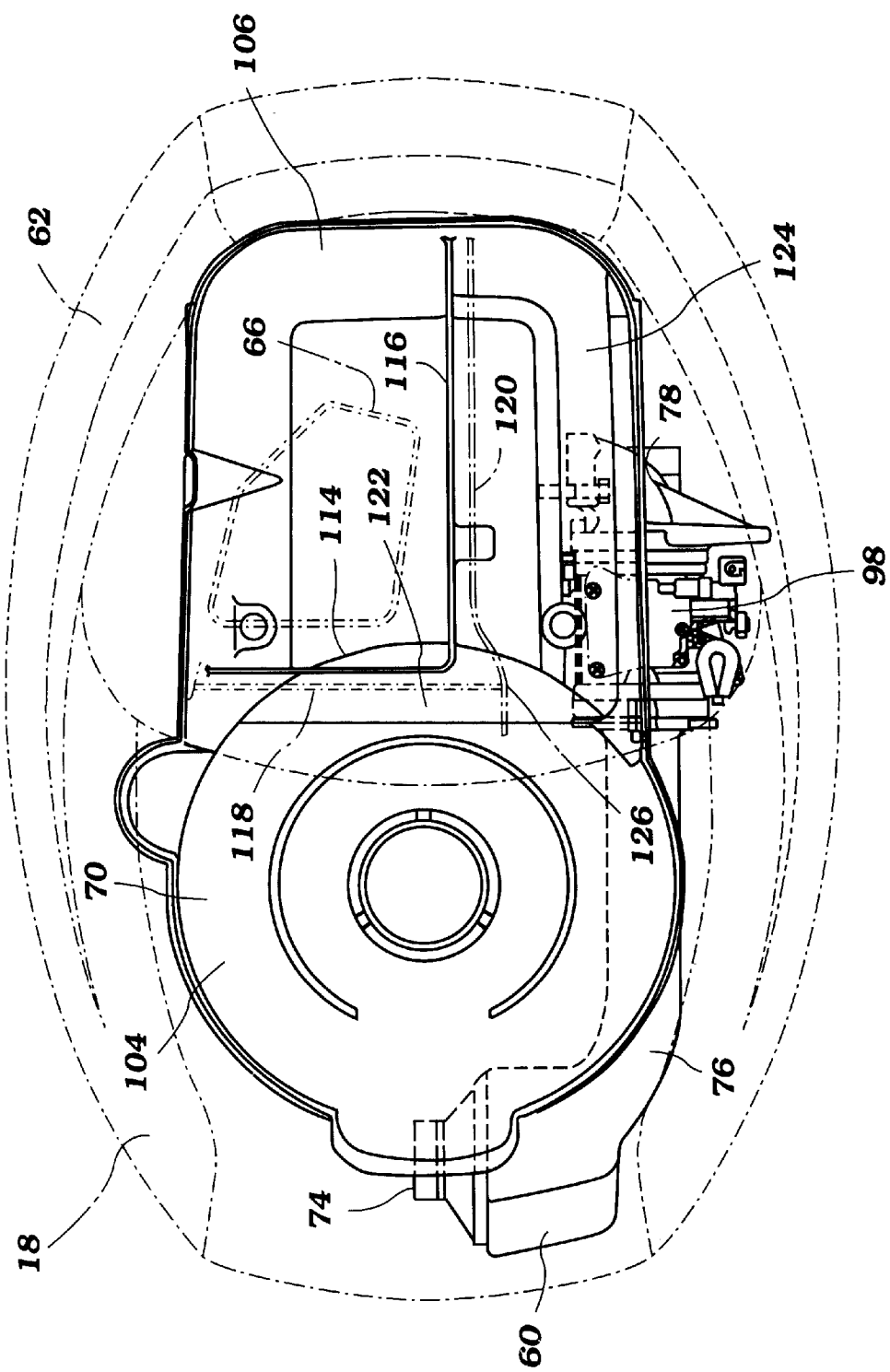
FIG. 8 is a top plan view of a cowling arrangement configured in accordance with another embodiment of the present invention, with various components of the motor illustrated in phantom.

FIG. 8 illustrates another embodiment of a cowling arrangement constructed in accordance with the present invention. The principal differences between the embodiment of FIGS. 1–7 and the embodiment of FIG. 8 lie with the arrangement of the ribs extending from the dividing wall section. Therefore, for ease of description, similar features are ascribed the same reference numerals used for corresponding elements from the embodiment of FIGS. 1–7. Unless otherwise indicated, the above description of similar components should be understood as applying equally to the following embodiment.

In this embodiment, the forward rib 118 extends across the dividing wall section 72 and connects to the lateral rib 120, thereby forming a complete upper rib 126 extending downward from the dividing wall section 72 and along the ridge 112. While this arrangement functions generally like the embodiment of FIGS. 1–7, the complete rib 126 further limits the possibility of water splashing over the ridge 112 and impinging upon the throttle body 98. In addition, this arrangement further limits the possibility that water condensing on the dividing wall section 72 will impinge on the throttle body 98. Because the complete upper rib 126 is continuous, water condensing on the dividing wall section 72 can not travel laterally along the dividing wall section 72 and drip onto the throttle body 98. Instead, the complete upper rib 126 will cause this water to drip back onto the flywheel cover 70, where it can be collected and drained by the gutters.

Although this invention has been described in terms of certain embodiments, other embodiments apparent to those of ordinary skill in the art also are within the scope of this invention. Thus, various changes and modifications may be made without departing from the spirit and scope of the invention. Accordingly, the scope of the invention is intended to be defined only by the claims that follow.

What is claimed is:

1. An outboard motor for operating in a body of water comprising a cowling having an air intake, an internal combustion engine positioned within the cowling, the engine including a generally vertically oriented crankshaft, a flywheel attached to an upper end of the crankshaft, at least one throttle device positioned on a side of the engine to adjust an air volume supplied to the engine, and a flywheel cover extending above at least a portion of the flywheel and attached to an upper end of the engine, the flywheel cover positioned between the upper end of the engine and a portion of the cowling, the flywheel cover including at least one upwardly extending rib positioned between the air intake and the throttle device so as to direct water, which enters the cowling through the air intake, away from the throttle device, wherein at least a portion of the upwardly extending rib is arranged relative to the cowling so that a portion of air from the air intake flows across the rib toward the side of the engine.

2. The outboard motor of claim 1, wherein the cowling additionally includes at least one downwardly extending rib that lies next to and cooperates with an upper edge of the flywheel cover rib to form a tortuous air flow path across the ribs and between the air intake and the throttle device.

3. The outboard motor of claim 2, wherein the flywheel cover further includes at least one gutter disposed on an upper surface of the flywheel cover.

4. The outboard motor of claim 3, wherein the gutter is located in the tortuous air path between the downwardly extending rib and the throttle device.

5. The outboard motor of claim 3, wherein the gutter extends in generally a fore-to-aft direction along the flywheel cover.

6. The outboard motor of claim 2, wherein the cowling air intake comprises a downwardly extending air duct in communication with an air intake port, and the upwardly extending rib and downwardly extending rib are located between the hollow air duct and the throttle device.

7. The outboard motor of claim 1, wherein the flywheel cover additionally includes at least one gutter disposed on an upper surface of the flywheel cover.

8. The outboard motor of claim 7, wherein the gutter extends in generally a fore-to-aft direction and slopes downward toward the aft end of the flywheel cover.

9. The outboard motor of claim 8, wherein the flywheel cover includes another upwardly extending rib that lies generally transverse to the gutter and is positioned near a fore end of the gutter.

10. The outboard motor of claim 1, wherein the flywheel cover includes another upwardly extending rib that extends in a direction generally transverse to the other rib.

11. An outboard motor for operating in a body of water comprising a cowling having an air intake, an internal combustion engine positioned within the cowling, the engine including a generally vertically oriented crankshaft, a flywheel attached to an upper end of the crankshaft, at least one throttle device positioned on a side of the engine to adjust an air volume supplied to the engine, and a flywheel cover extending above at least a portion of the flywheel and positioned between an upper end of the engine and a portion of the cowling, the flywheel cover being attached to an upper end of the engine and including at least one gutter disposed on an upper surface of the flywheel cover, and an air path defined from the air intake to the side of the engine, at least a portion of the air path passing generally transversely across the gutter.

12. The outboard motor of claim 11, wherein the gutter extends in generally a fore-to-aft direction along the cover.

13. The outboard motor of claim 12, wherein the gutter slopes downward toward an aft end of the cover.

14. The outboard motor of claim 11, wherein the cover additionally includes at least one upwardly extending rib, and the gutter is located between the upwardly extended rib and the throttle device.

15. An outboard motor for operating in a body of water comprising a cowling having an air intake, an internal combustion engine positioned within the cowling, the engine including a generally vertically oriented crankshaft, a flywheel attached to an upper end of the crankshaft, a front end, a rear end, a first side, a second side, at least one throttle device positioned on the first side of the engine to adjust an air volume supplied to the engine, and a flywheel cover extending above at least a portion of the flywheel and positioned between an upper end of the engine and a portion of the cowling, the flywheel cover being attached to the upper end of the engine, and means for inhibiting water, which enters the cowling through the air intake, from contacting the throttle device of the engine, wherein the means for inhibiting water is adapted so that a portion of air from the air intake flows generally transversely across the inhibiting means toward the first side of the engine.

16. The outboard motor of claim 15, wherein the means is located between the flywheel cover and a portion of the cowling.

17. The outboard motor of claim 16, wherein the means is positioned in an air path defined between the air intake and the throttle device.

18. The outboard motor of claim 15, further comprising at least one gutter means for draining water from the upper surface of the flywheel body.

19. The outboard motor of claim 15, wherein the cowling air intake comprises a downwardly extending hollow air duct in communication with an air intake port, and the upwardly extending rib and downwardly extending rib are located between the hollow air duct and the throttle device.

20. The outboard motor of claim 1, wherein the portion of air from the air intake flows between the rib and the cowling.

21. The outboard motor of claim 2, wherein the air intake opens toward a side of the engine opposite the throttle device.

22. An outboard motor for operating in a body of water comprising a cowling having an air intake, an internal combustion engine positioned within the cowling, the engine having a front end, a back end, a first side, and a second side and including a generally vertically oriented crankshaft, a flywheel attached to an upper end of the crankshaft, at least one throttle device positioned on the first side of the engine to adjust an air volume supplied to the engine, and a flywheel cover extending above at least a portion of the flywheel and positioned between an upper end of the engine and a portion of the cowling, the flywheel cover including at least one upwardly extending rib positioned between the air intake and the throttle device so as to direct water, which enters the cowling through the air intake, away from the throttle device, wherein the flywheel cover further includes at least one gutter extending in generally a fore-to-aft direction along an upper surface of the flywheel cover, and at least a portion of air that enters the cowling through the air intake is directed to the second side of the engine.

23. The outboard motor of claim 22, wherein the cowling additionally includes at least one downwardly extending rib that lies next to and cooperates with an upper edge of the flywheel cover rib to form a torturous air flow path across the ribs and between the air intake and the throttle device.

24. The outboard motor of claim 23, wherein the gutter is located in the air path between the downwardly extending ribs and the throttle device.

25. The outboard motor of claim 23, wherein the cowling air intake comprises a downwardly extending air duct in communication with an air intake port, and the upwardly extending rib and downwardly extending rib are located between the hollow air duct and the throttle device.

26. The outboard motor of claim 22, wherein the flywheel cover includes another upwardly extending rib that lies generally transverse to the gutter and is positioned near a fore end of the gutter.

27. The outboard motor of claim 22, wherein the flywheel cover includes another upwardly extending rib that extends in a direction generally transverse to the other rib.

28. An outboard motor for operating in a body of water, comprising a cowling having an air intake, an internal combustion engine positioned within the cowling and having a front end, a rear end, and first and second sides, the engine including a generally vertically oriented crankshaft, a flywheel attached to an upper end of the crankshaft, at least one throttle device positioned on the first side of the engine to adjust an air volume supplied to the engine, and a flywheel cover extending above at least a portion of the flywheel and positioned between an upper end of the engine and a portion of the cowling, the flywheel cover including at least one upwardly extending rib positioned between the air intake and the throttle device so as to direct water, which enters the cowling through the air intake, away from the throttle device, wherein the air intake opens at a point closer to the second side of the engine than to the first side of the engine, and intake air is permitted to flow across at least the first or second side of the engine.

29. The outboard motor of claim 28, wherein the flywheel cover is attached to an upper end of the engine.

30. The outboard motor of claim 29, wherein the cowling has a downwardly extending rib positioned adjacent the upwardly extending rib, and the ribs cooperate to define a tortuous air path therebetween.

31. The outboard motor of claim 30, wherein the flywheel cover additionally comprises a gutter disposed on an upper surface of the flywheel cover.

32. An outboard motor for operating in a body of water, comprising a cowling having an air intake, an internal combustion engine positioned within the cowling and having a front end, a rear end, a first side and a second side, the engine including a generally vertically oriented crankshaft, a flywheel attached to an upper end of the crankshaft, and a flywheel cover extending above at least a portion of the flywheel and positioned between an upper end of the engine and a portion of the cowling, the flywheel cover including at least one upwardly extending rib positioned between the air intake and the first side of the engine, wherein the upwardly extending rib cooperates with the cowling to define a first air path between the air intake and the first side of the engine, and the first air path is more tortuous than a second air path between the air intake and the second side of the engine.

33. The outboard motor of claim 32, wherein the flywheel cover is attached to the upper end of the engine.

34. The outboard motor of claim 32, wherein at least one throttle device is positioned on the first side of the engine to adjust an air volume supplied to the engine.

35. The outboard motor of claim 34, wherein the upwardly extending rib is adapted to direct water, which enters the cowling through the air intake, away from the throttle device.

36. The outboard motor of claim 32, wherein the flywheel cover additionally comprises a second upwardly extending rib positioned forwardly of the air intake.

37. The outboard motor of claim 32, wherein the cowling has a downwardly extending rib, the downwardly extending rib being generally parallel to and positioned adjacent to the flywheel cover upwardly extending rib.

38. The outboard motor of claim 32, wherein the flywheel cover additionally comprises a gutter disposed on an upper surface of the flywheel cover.

39. The outboard motor of claim 38, wherein the gutter is adapted to direct water toward an aft end of the flywheel cover.

40. An outboard motor for operating in a body of water, comprising a cowling having an air intake, an internal combustion engine positioned within the cowling and having first and second sides, the engine including a generally vertically oriented crankshaft, a flywheel attached to an upper end of the crankshaft, at least one throttle device positioned on the first side of the engine to adjust an air volume supplied to the engine, and a flywheel cover extending above at least a portion of the flywheel and positioned between an upper end of the engine and a portion of the cowling, the flywheel cover being attached to an upper end of the engine and including at least one upwardly extending rib positioned between the air intake and the throttle device so as to direct water, which enters the cowling through the air intake, away from the throttle device, wherein the air intake opens at a point closer to the second side of the engine than to the first side of the engine.

41. The outboard motor of claim 40, wherein the cowling has a downwardly extending rib positioned adjacent the upwardly extending rib, and the ribs cooperate to define a tortuous air path therebetween.

42. The outboard motor of claim 41, wherein the flywheel cover additionally comprises a gutter disposed on an upper surface of the flywheel cover.

43. An outboard motor for operating in a body of water, comprising a cowling having an air intake, an internal combustion engine positioned within the cowling and having a first side and a second side, the engine including a generally vertically oriented crankshaft, a flywheel attached to an upper end of the crankshaft, and a flywheel cover extending above at least a portion of the flywheel and positioned between an upper end of the engine and a portion of the cowling, the flywheel cover attached to the upper end of the engine and including at least one upwardly extending rib positioned between the air intake and the first side of the engine, wherein the upwardly extending rib cooperates with the cowling to define a first air path between the air intake and the first side of the engine, and the first air path is more tortuous than a second air path between the air intake and the second side of the engine.

44. The outboard motor of claim 43, wherein at least one throttle device is positioned on the first side of the engine to adjust an air volume supplied to the engine.

* * * * *